Figure 9:
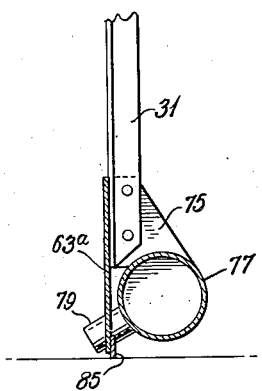

Sept. 1, 1936.   M. B. TARK   2,052,676
SLUDGE DISCHARGE COLLECTOR
Filed March 2, 1935   4 Sheets-Sheet 1
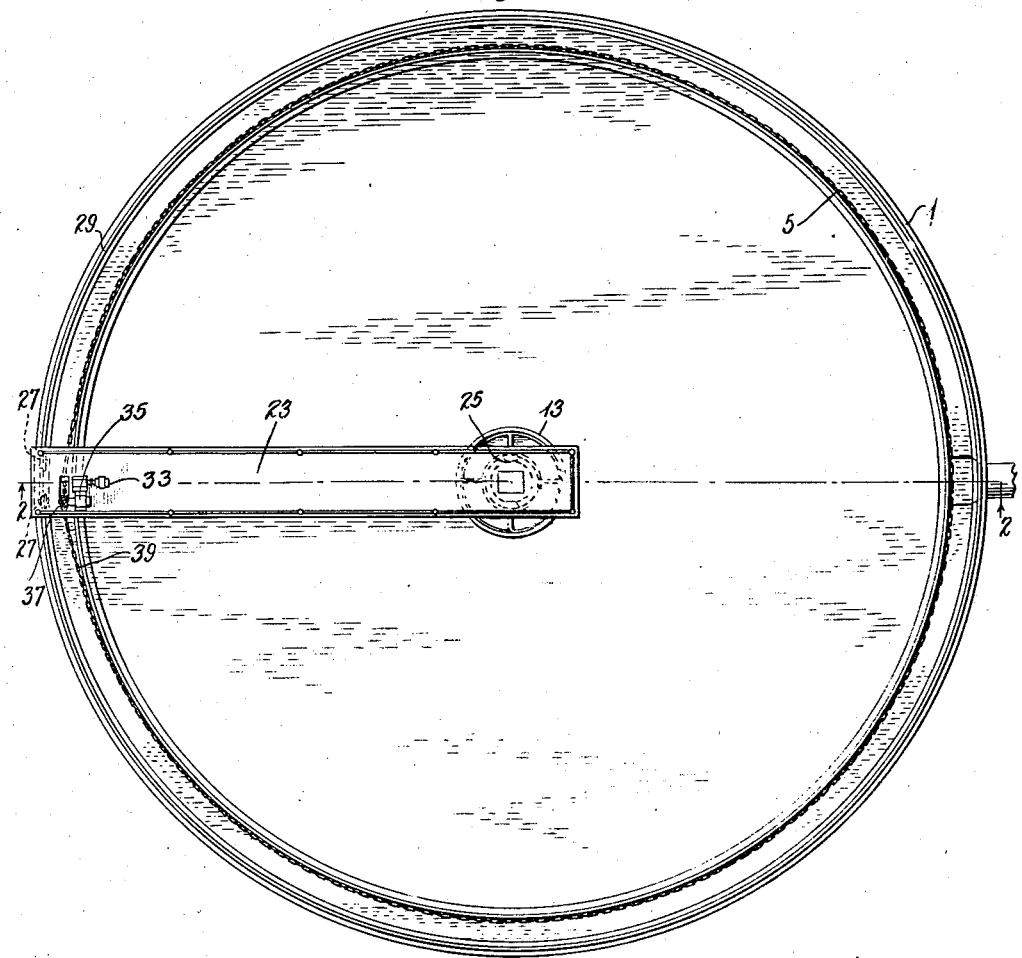
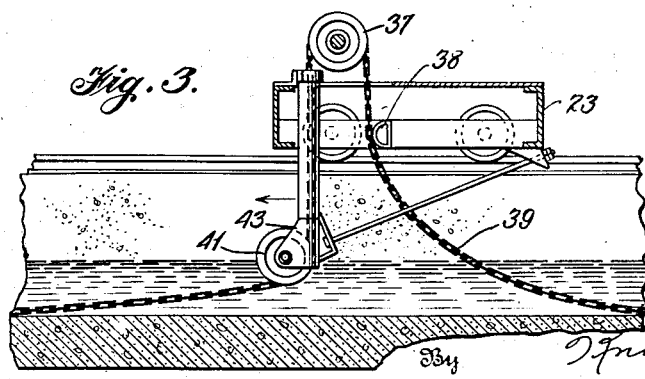
Inventor
Marcus B. Tark

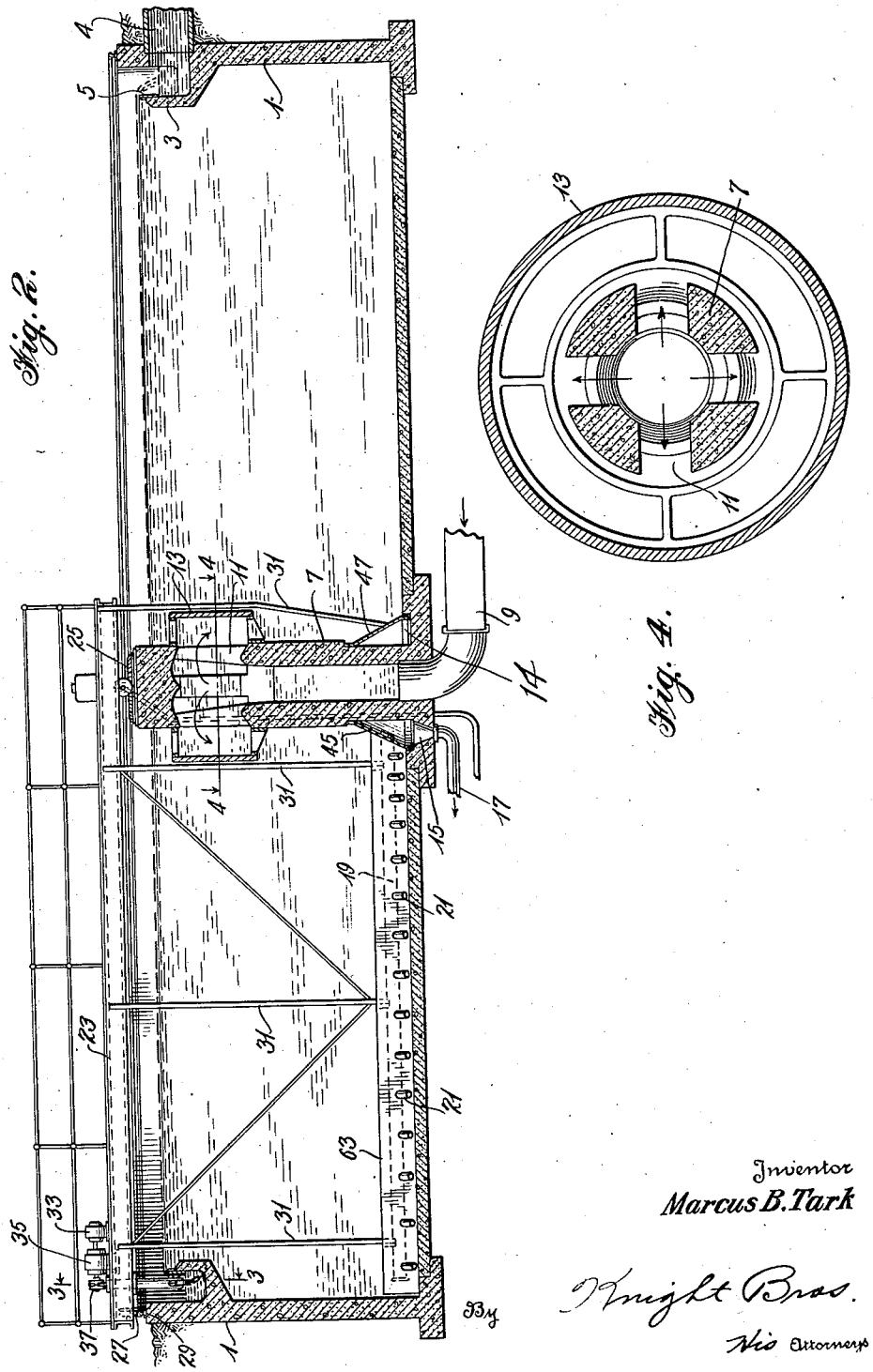

Sept. 1, 1936.  M. B. TARK  2,052,676
SLUDGE DISCHARGE COLLECTOR
Filed March 2, 1935  4 Sheets-Sheet 3
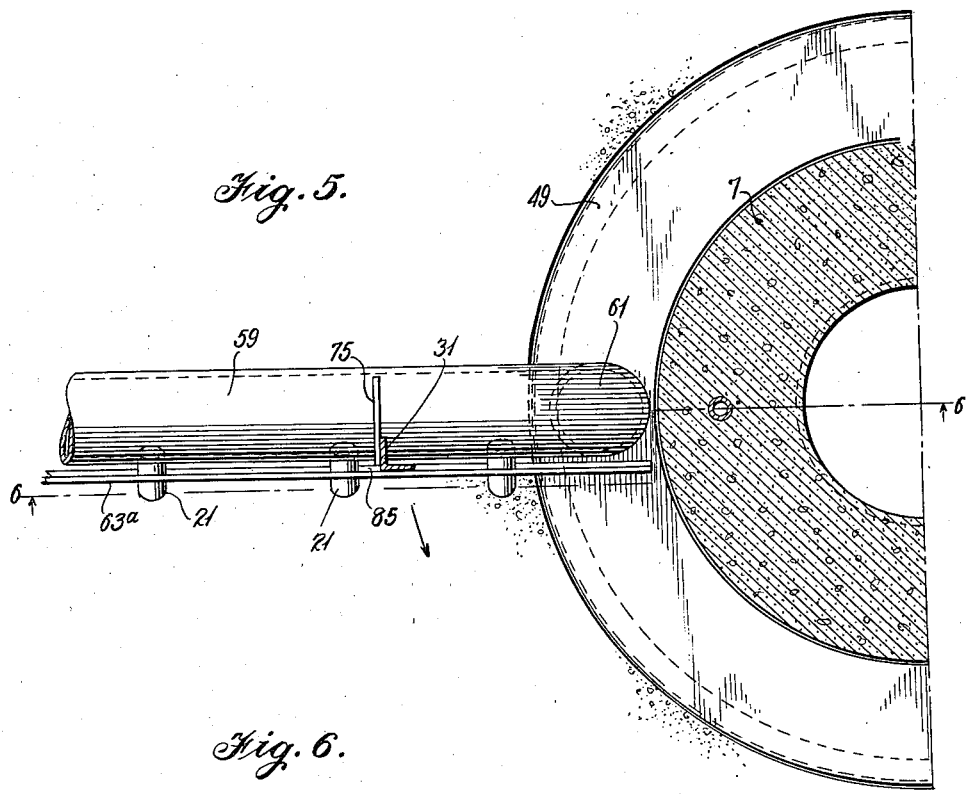
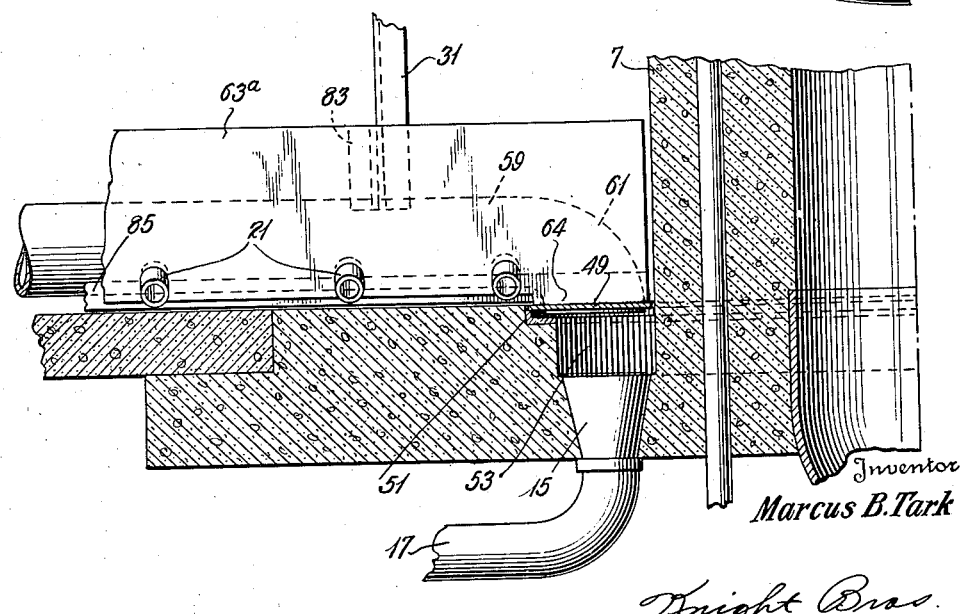
Inventor
Marcus B. Tark
By Knight Bros.
His Attorneys Sept. 1, 1936. M. B. TARK 2,052,676
SLUDGE DISCHARGE COLLECTOR
Filed March 2, 1935 4 Sheets-Sheet 4

Inventor
Marcus B. Tark
By Knight Bros.
Attorneys

Patented Sept. 1, 1936

2,052,676

UNITED STATES PATENT OFFICE 2,052,676

SLUDGE DISCHARGE COLLECTOR

Marcus B. Tark, Philadelphia, Pa., assignor to Link-Belt Company, Philadelphia, Pa.

Application March 2, 1935, Serial No. 9,086

4 Claims. (Cl. 210—55)

This invention relates to the arrangement of influent channels and to sludge draw-off devices for settling tanks and its principal object is to provide an efficient device of this kind which will distribute the sewage uniformly over the tank and remove the sludge with a minimum amount of moisture.

A particular object of the invention is to provide a device of this kind comprising a sludge pipe having inlet ports for sludge, in combination with a sludge plate which keeps the sludge piled up over the inlet ports and prevents the supernatent liquor from breaking through and increasing the moisture content of the sludge withdrawn from the tank.

Another object is to provide a machine for removing sludge from round settling tanks having the influent in the center, and comprising a revolving sludge pipe which delivers sludge to an annular stationary sludge channel near the center of the tank.

Another object is to provide a machine for removing sludge from round tanks having the influent in the center, and comprising a revolving bridge from which is suspended a sludge pipe having inlet ports with gates adjustable from the bridge, so that the withdrawal from each part of the tank can be regulated without emptying the tank.

Other objects will appear from the following description of an illustrative embodiment of the invention, with several modifications, as shown in the accompanying drawings.

Figure 10:
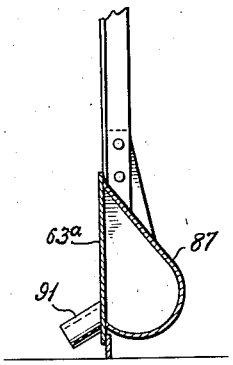
Figure 11:
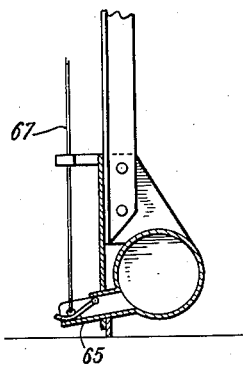
Figure 7:
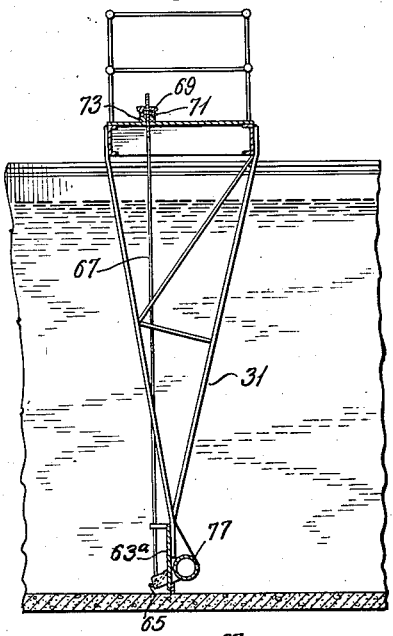
Figure 8:
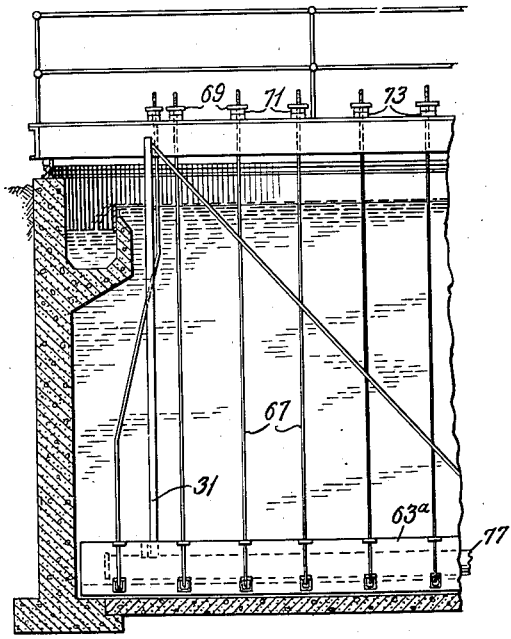
Figure 12:
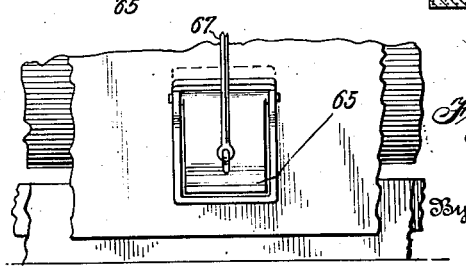

In the drawings:

Fig. 1 is a plan view of a round settling tank showing a revolving bridge from which the sludge pipe is suspended, Fig. 2 is a vertical section on the line 2—2 of Fig. 1, Fig. 3 is a detail section on the line 3—3 of Fig. 2, showing a part of the bridge driving mechanism, Fig. 4 is a detail section on the line 4—4 of Fig. 2, Fig. 5 is a horizontal section of a portion of the central effluent column with a modified form of sludge pipe and cover plate, Fig. 6 is a vertical section on the line 6—6 of Fig. 5, Fig. 7 is a vertical transverse section of the bridge showing the sludge pipe suspension, Fig. 8 is a fragmentary vertical sectional view of the outer end of the bridge showing the sludge pipe suspension and adjusting rods, Figs. 9 and 10 are detail transverse sections of two modifications of the sludge pipe, Fig. 11 is a detail transverse section of a sludge pipe showing an inlet port controlled by an adjustable gate, and Fig. 12 is a view at right angles to Fig. 11 looking into the end of an inlet port.

In the drawings, there is shown a round settling tank having an outer wall 1 on which is supported an effluent trough 3 with an overflow weir 5, from which leads an effluent pipe 4. At the center of the floor 6 of the tank rises a hollow column 7 into which leads an influent pipe 9 and out of the hollow center of which open influent channels 11. A c'rcular baffle 13 surrounds the influent channels to retard the incoming stream and to distribute the flow equally in all directions from the central column.

In the floor of the tank around the central column 7 is an annular sludge channel 14 into which opens the hopper 15 of a sludge draw-off pipe 17. Sludge is delivered to the sludge channel 14 by a sludge pipe 19 having suction ports 21 distributed along its length. The sludge pipe is preferably suspended from a bridge 23 extending across the top of the tank from the central column 7 to the outer wall 1. The inner end of the bridge can be supported by a beveled roller race and pivot casting 25, and its outer end by wheels 27 traveling upon a circular track 29 on the top of the side wall 1. The sludge pipe 19 can be suspended from the bridge by means of a truss 31. The outer end of the bridge can be driven by a motor 33 through a reducing gear 35, which drives a pocketed chain wheel 37 (Fig. 3). There is laid in the effluent trough 3 a slack chain 39 which runs under pulley 41 mounted on a bracket 43, up over chain wheel 37, and down past a guide 38 into the trough 3 again. The chain wheel 37 draws the chain up over itself as it rotates and thereby drives the outer end of the bridge forward in the direction of the arrow in Fig. 3, the chain binding against the side of the effluent trough throughout its length, except that portion which is momentarily traveling over the pulley 37.

It is a desideratum in the treatment of sludge to make the initial moisture content as low as possible, since preparation of the sludge for final disposal involves primarily a process of reducing the moisture content to a low figure. Sludge draw-off systems employing scraping devices to convey the sludge from all parts of the floor to the sludge draw-off hopper have the disadvantage that it is difficult to prevent an excess of moisture from escaping with the sludge because the traveling scrapers make it impossible to seal off the sludge hopper from the supernatent liquor. Sludge pipes would afford a particularly satisfactory means for removing sludge from settling tanks, if it were not for the fact that as ordinarily used there is the ever-present danger of one or more inlet ports of the sludge pipe becoming uncovered, due to the thinness of the sludge deposit on certain parts of the floor of the tank, with the result that the supernatent liquor breaks through and increases the moisture content of the sludge. The advantages of the sludge pipe are secured by my invention, while eliminating the disadvantage just mentioned, by providing a sludge plate 63 which scrapes the sludge into a pile or ridge over the suction ports 21 and thereby prevents them from becoming uncovered. A further control is obtained by means of adjustable gates 65 in each suction port (Figs 7, 8, 11 and 12). There is connected to each gate a rod 67 which extends up through the floor of the bridge. The top of rod 67 is threaded to receive a threaded hand wheel 69 having a flanged collar 71 engaging a flanged bush 73 fixed to the floor of the bridge. By rotating hand wheel 69 the rod 67 is screwed up or down with reference to the floor of the bridge. By this means, the gates of the suction ports can be regulated to control the withdrawal of sludge from each portion of the floor of the tank in accordance with the rate of sedimentation. The provision of rods extending to the bridge makes it possible to carry out the adjustment while the tank is in operation.

The inner end of the sludge pipe 19 (Fig. 2) extends into a chamber 45 formed over sludge channel 14 by a conical cover plate 47. This cover plate may be welded to the truss 31 and sludge plate 63 so as to revolve with the bridge and sludge pipe. It is fitted to the column 7 and floor 6 sufficiently tightly to avoid excessive leakage of the supernatent liquor into the chamber 45. The cover plate 47 is preferably steeply sloped to avoid accumulation of sludge upon it.

An alternative form of the cover plate and connecting end of the sludge pipe is shown in Figs. 5 and 6. In this case, a flat cover plate 49 rests upon the edge of a circular angle plate 51 to form a sludge channel 53 communicating with hopper 15 of sludge discharge pipe 17. The end of sludge pipe 59 curves downward at 61 through cover plate 49. The sludge plate 63a as shown in this modification, may be provided with a downward projection 64 to be welded to cover plate 49.

The sludge pipe may take various forms. Two of these are shown by way of example in Figs. 9 and 10. In Fig. 9 the bottom end of frame 31 has fixed to it brackets 75, which are secured to sludge pipe 77, only one of the brackets 75 being shown in Fig. 9. The sludge pipe 77 is round in cross section and has short pipes 79 forming inlet ports distributed along its length. These short pipes 79 extend through a sludge plate 63a fixed to flanges 83 (Figs. 5 and 6) of brackets 75. The sludge plate 63a may be provided with an adjustable edge plate 85 to secure a clean sweep of the floor.

Fig. 10 shows a modified form of sludge pipe formed by a trough-shaped plate 87 covered by sludge plate 63a. Stub pipes 91 form inlet ports through the sludge plate 63a and into the space enclosed by the trough 87.

The invention is not limited to any particular form of the sludge pipe, nor its inlet ports and gates, nor to the supporting means shown. The connection between the sludge pipe and sludge draw-off hopper may be of any suitable form. In fact, there can be considerable modification of the form of apparatus shown without departing from the scope of the claims which follow.

I claim:

1. In a device of the class described, a round settling tank, a column at the center of the tank containing an influent channel, a bridge pivoted on said column and rollingly supported at its outer end on the periphery of the tank, means for driving the outer end of said bridge, a sludge pipe suspended from said bridge extending radially above the floor of the tank and provided with openings for the intake of sludge, an annular sludge channel around said column connected to said sludge pipe, and connecting means providing enclosed communication between said sludge channel and said sludge pipe in all positions of the latter, said connecting means being so constructed as substantially to prevent liquid from entering said sludge channel directly from the tank without passing through said sludge pipe.

2. In a device of the class described, a round settling tank, a column at the center of the tank containing an influent channel, a bridge pivoted on said column and rollingly supported at its outer end on the periphery of the tank, means for driving the outer end of said bridge, a sludge pipe suspended from said bridge extending radially above the floor of the tank and provided with openings for the intake of sludge, an annular sludge channel around said column, and a cover plate rotating with said sludge pipe, said cover plate enclosing the upper open end of the channel and forming between said cover plate and said column an enclosed space over said channel.

3. In a device of the kind described, a settling tank, a bridge traveling thereover, a sludge pipe suspended from said bridge having a plurality of inlet ports, and means operable from said bridge for adjusting the opening of said inlet ports.

4. In a device of the class described, a round settling tank, an influent pipe at the center of the tank, an annular sludge channel below the floor of the tank, a column in the center of the tank, a bridge pivoted on said column and rollingly supported at its outer end on the periphery of the tank, means for driving said bridge, a sludge pipe suspended from said bridge and provided with openings for the intake of sludge and connecting means providing enclosed communication between said sludge channel and said sludge pipe in all positions of the latter, said connecting means being so constructed as substantially to prevent liquid from entering said sludge channel directly from the tank without passing through said sludge pipe.

MARCUS B. TARK.